United States Patent
Hershey et al.

(10) Patent No.: US 7,518,631 B2
(45) Date of Patent: Apr. 14, 2009

(54) AUDIO-VISUAL CONTROL SYSTEM

(75) Inventors: John R. Hershey, White Plains, NY (US); Zhengyou Zhang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 11/168,124

(22) Filed: Jun. 28, 2005

(65) Prior Publication Data

US 2007/0016426 A1 Jan. 18, 2007

(51) Int. Cl.
H04N 7/14 (2006.01)
(52) U.S. Cl. .................................... 348/14.1; 379/88.1
(58) Field of Classification Search ............... 379/88.1, 379/88.01–88.03; 348/14.6, 171, 14.05; 725/18, 19, 10, 12
See application file for complete search history.

(56) References Cited

U.S. PATENT DOCUMENTS

| | | | | |
|---|---|---|---|---|
| 5,502,727 A | * | 3/1996 | Catanzaro et al. | 370/271 |
| 5,940,118 A | * | 8/1999 | Van Schyndel | 348/14.05 |
| 6,005,610 A | * | 12/1999 | Pingali | 348/169 |
| 6,157,403 A | * | 12/2000 | Nagata | 348/171 |
| 6,292,675 B1 | * | 9/2001 | Nilsson | 379/88.01 |
| 2002/0101623 A1 | * | 8/2002 | Matsumoto et al. | 358/440 |
| 2002/0105575 A1 | * | 8/2002 | Hinde et al. | 348/14.01 |
| 2002/0194586 A1 | * | 12/2002 | Gutta et al. | 725/10 |
| 2003/0184645 A1 | * | 10/2003 | Biegelsen et al. | 348/14.1 |
| 2004/0130442 A1 | * | 7/2004 | Breed et al. | 340/443 |
| 2005/0081160 A1 | * | 4/2005 | Wee et al. | 382/209 |

OTHER PUBLICATIONS

Ivan Tashev, Henrique Malvar, "A New Beamformer Design Algorithm for Microphone Arrays", in Proceedings of 2005 IEEE International Conference on Acoustics, Speech, and Signal Processing, Mar. 18-23, 2005, Philadelphia, PA, USA.
R. Xiao, M.J. Li, H.J. Zhang, "Robust Multi-Pose Face Detection in Images", IEEE Transactions on Circuits and Systems for Video Technology, vol. 14, Issue:1, pp. 31-41, Jan. 2004.
Yunqiang Chen and Yong Rui Real-time Speaker Tracking Using Particle Filter Sensor Fusion, Proceedings of the IEEE, vol. 92, No. 3, pp. 485-494, Mar. 2004.

* cited by examiner

Primary Examiner—Curtis Kuntz
Assistant Examiner—Maria El-Zoobi
(74) Attorney, Agent, or Firm—Westman, Champlin & Kelly, P.A.

(57) ABSTRACT

A visual control system controls a controlled component. In one embodiment, the visual control system controls the controlled component based on a visual location of a user. In another embodiment, input from a visual perception device is used to provide focus control for an audio input device. In additional embodiments, the visual control system stops, starts or suppresses speech recognition or other audio functions when the direction of the sound detected by the audio input device is not coming from the user's visual location.

20 Claims, 8 Drawing Sheets

AUDIO-VISUAL CONTROL SYSTEM

BACKGROUND

Audio systems, such as speech recognition or other audio systems are susceptible to interruptions or interference. For example, some speech recognition systems require a close talk microphone to reduce interfering noise as well as a manual input to initiate speech recognition.

In such systems, the user must manually start operation. The user must also repetitively stop recognition each time the user is interrupted or whenever there is excessive background noise. Following interruption, the user must restart operation or speech recognition. This type of manual control of speech recognition intervals can be burdensome if the user faces multiple interruptions or if the user is in a noisy environment. Additionally interfering or background noise can degrade speech recognition quality since the system may process the background noise instead of the user's speech.

Some microphone arrays are used in speech recognition and can provide direction-sensitive noise suppression to limit noise interference. Such microphone arrays can estimate the direction from which sound is arriving and focus audio detection on the user by focusing on the loudest sound. However, in many instances, the loudest sound may not be from the user and in such circumstances, the microphone array is misfocused. The present invention addresses one or more of these and/or other problems and has application for speech recognition systems and other audio systems.

SUMMARY

A visual control system controls speech recognition functions or other audio functions. In one embodiment the visual control system is a look-to-talk control system. In illustrated embodiments, the look-to-talk interface uses input from a visual perception device (such as a camera) to start, stop or suppress speech recognition or other audio functions.

In another embodiment, input from the visual perception device is used to focus an audio device or audio receiving device. Input from the visual perception device is processed to locate the user. The user's location is then used to focus the audio device so that it is orientated relative to the direction of the user.

In other embodiments, the visual control system uses input from the audio device and visual perception device to stop, start or suppress speech recognition or other audio function. Speech recognition is suppressed when the direction of the sound detected by the audio device is not coming from the user's location as determined by the visual device.

The above summary is provided to introduce a selection of concepts in a simplified form that are further described in the Detailed Description section below. This summary is not intended to identify key features or essential features of the claimed subject matter, nor is it intended to be used as an aid in determining the scope of the claimed subject matter.

DETAILED DESCRIPTION OF ILLUSTRATIVE EMBODIMENTS

Figure 1:
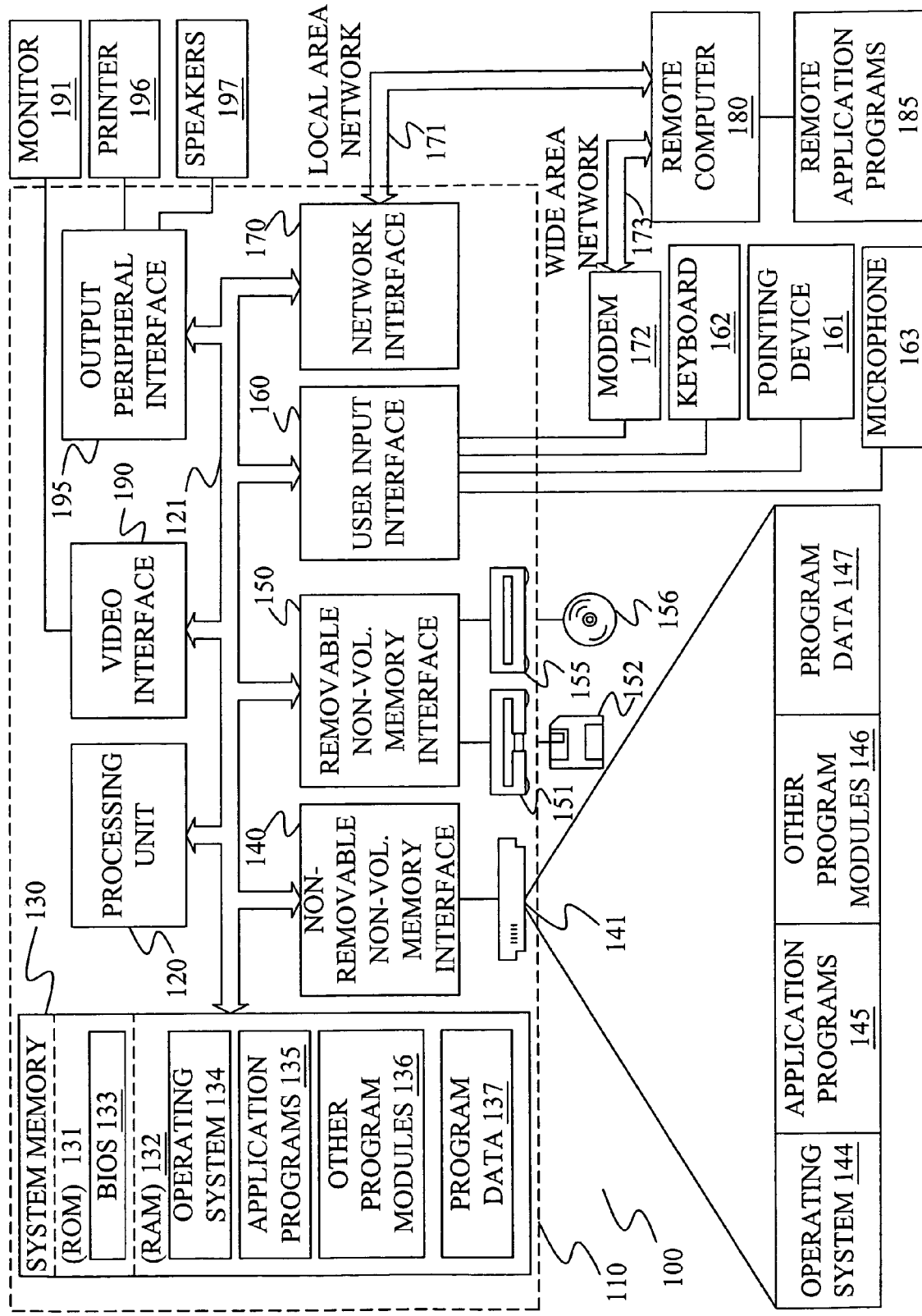
FIG. 1 is a block diagram of one illustrative embodiment of a computing environment in which embodiments of the present invention can be used or implemented.

Embodiments of the present invention include an audio-visual control system which has application for speech recognition and which can be implemented in a computing environment as illustrated in FIG. 1. Prior to describing the invention in more detail, an embodiment of a computing environment 100 in which the invention can be implemented will be described with respect to FIG. 1.

The computing system environment 100 shown in FIG. 1 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. Those skilled in the art can implement aspects of the present invention as instructions stored on computer readable media based on the description and figures provided herein.

The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Embodiments of the present invention include an audio-visual control system which has varied applications as illustrated in FIGS. 2-8. In each of the illustrated embodiments or applications, visual input is used in controlling an audio function, such as speech recognition, or video telephone conference audio inputs.

Figure 2:
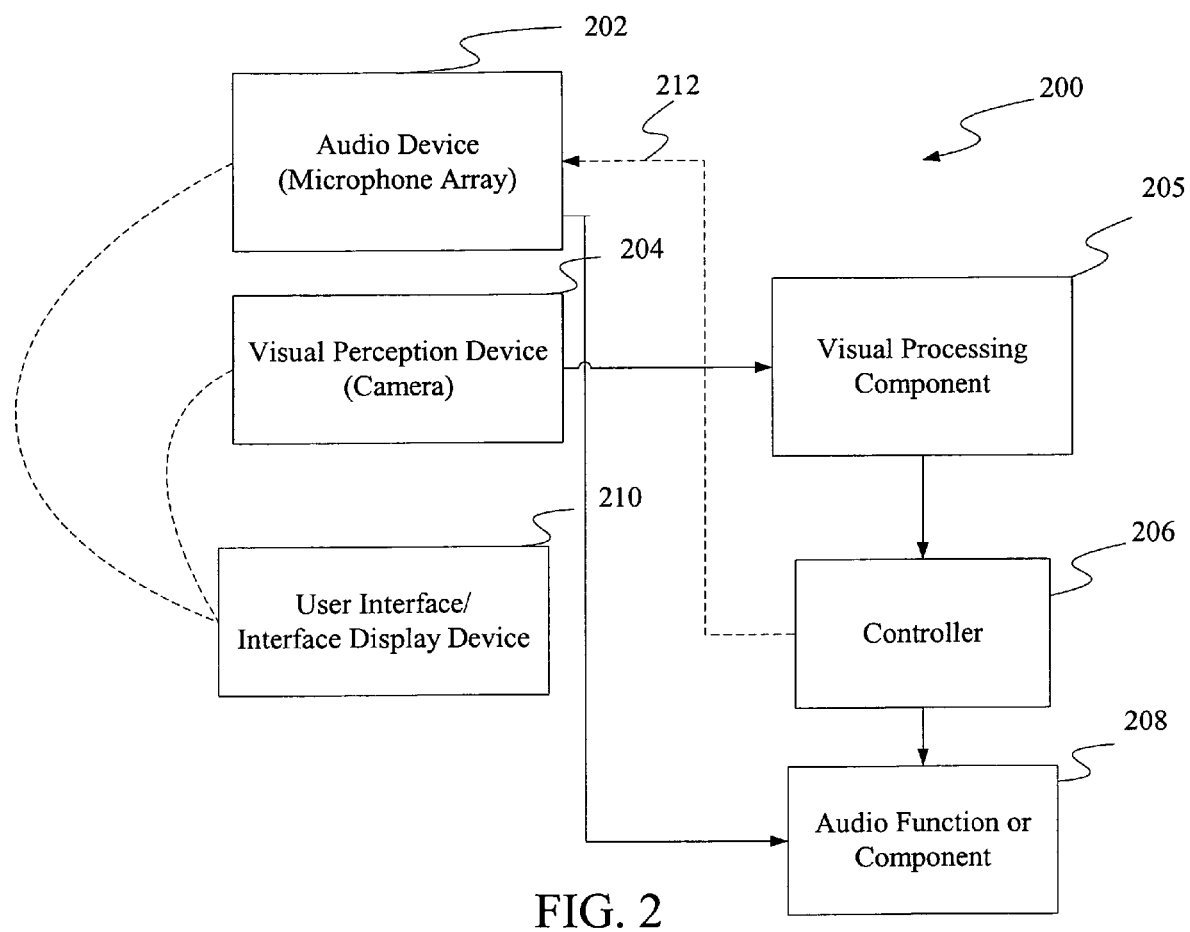
FIG. 2 is a block diagram of an embodiment of a visual control system including a look-to-talk function.

In one embodiment illustrated in FIG. 2, the control system includes an audio device or audio receiving device 202 (such as a microphone or microphone array) and a visual perception device 204 (such as a camera), as well as a visual processing component 205 and a controller 206. Controller 206 is shown controlling an audio function or component 208. System 200 as shown also includes a user display device or user interface 210 which as illustrated by dotted lines is physically located near or relative to the visual perception device 204 and audio device 202.

In the embodiment shown in FIG. 2, visual processing component 205 receives a visual input from device 204 and provides an input to controller 206 based on the content of the visual input or signal. Controller 206, in turn, controls an audio function or component 208 (such as a speech recognition function or component) which receives input from the audio device 202. Controller 206 controls the audio function or component 208 based on the input from visual processing component 205. In illustrated embodiments, the controller 206 controls the audio function by turning off the audio device 202 as illustrated by line 212 or by disabling or suppressing the audio function or component 208.

In one embodiment, the system 200 implements a "look-to-talk" function which is used to start, stop and/or control audio function or component 208. The audio function 208, such as speech recognition, receives speech or audio input from the audio device 202. The "look-to-talk" controller 206 controls the audio function or component 208 based upon input from the visual perception device, such as a camera, 204 as processed by the visual processing component 205.

In the "look-to-talk" application shown, the visual processing component 205 detects when the user is facing towards a given location, for example. For instance, user interface device 210 may illustratively be a computer display or monitor coupled to the computer performing the controlled audio function 208. Assume for instance that the audio function represented by block 208 is a speech recognition function performed on the computer including the monitor or display device. In that embodiment, controller 206 controls the speech recognition function based on whether the user is facing the monitor or display device 210.

For example, in an illustrative embodiment, the controller 206 starts, stops and interrupts speech recognition based upon detection of the frontal view of the user. It is assumed that if the user is not facing the user interface or monitor 210, the user may have been interrupted or has otherwise ceased using the speech recognition function at least temporarily.

Figure 3:
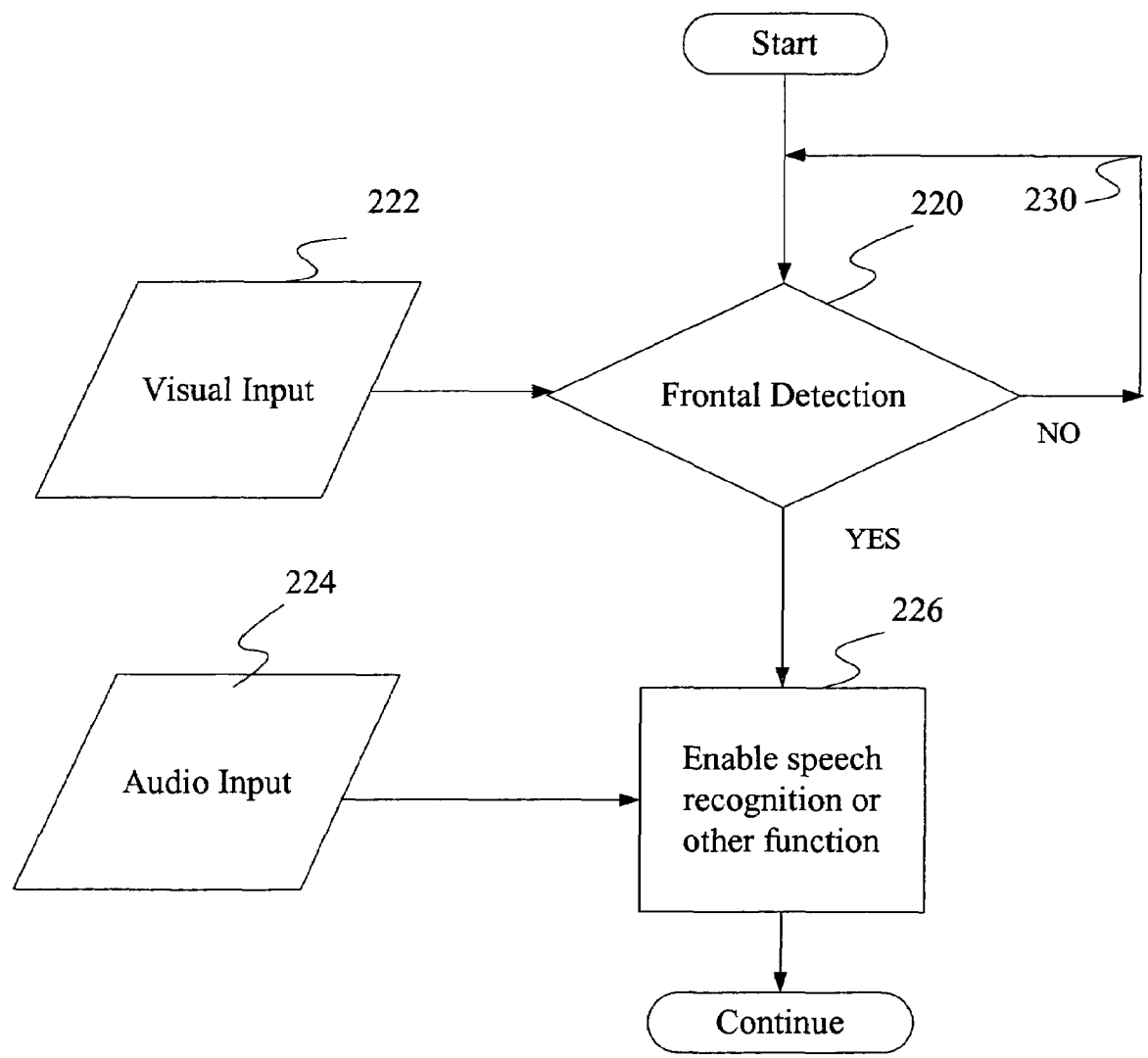
FIG. 3 is a flow chart illustrating steps for implementing a look-to-talk control system.

FIG. 3 illustrates steps for implementing a "look-to-talk" control system for speech recognition. As shown in step 220, visual processing component 205 determines whether a frontal face is detected based upon visual input 222 from the visual perception device 204. When the frontal face is detected, it assumed that the user is facing the monitor or other user interface 210. In that case, the speech recognition or other audio function 208 is enabled and audio input 224 or sound from the audio device 202 is provided for speech recognition, or another audio function, as illustrated by step 226.

In an illustrated embodiment, the "look-to-talk" function can be used to execute a command and/or control a computer function based upon the user's utterances or speech. For example, the "look-to-talk" function can be used to control a speech recognition component which recognizes the command "call John Smith" and is programmed to implement or execute the command. In the look-to-talk application, recognition and implementation of the user's commands is based upon detection of whether the user is oriented in a predetermined orientation, such as facing the user interface or display device 210, as described above.

In one embodiment, the detection is continuous or intermittent so the system continues to receive and use audio input 224 while the frontal face is detected. In particular, for speech recognition applications, the audio input 224 is processed by a speech recognition component as long as the system detects the frontal face of the user in the vicinity of the user interface 210. If the frontal face is not detected, then the system continues to look for the frontal face as illustrated by line 230, ignoring or suppressing the audio input 224 from the audio device 202 until the frontal face is detected.

In the embodiment described, the face is detected by a face detector which detects the lack of a frontal face when the user turns away. One embodiment of a face detector is shown in R. Xiao, M. J. Li, H. H. Zhang, "Robust Multi-Pose Face Detection in Images", IEEE Transactions on Circuits and Systems for Video Technology", Vol: 14, Issue: 1, pages 31-41, January 2004 although application is not limited to a particular face detection methodology.

Figure 4:
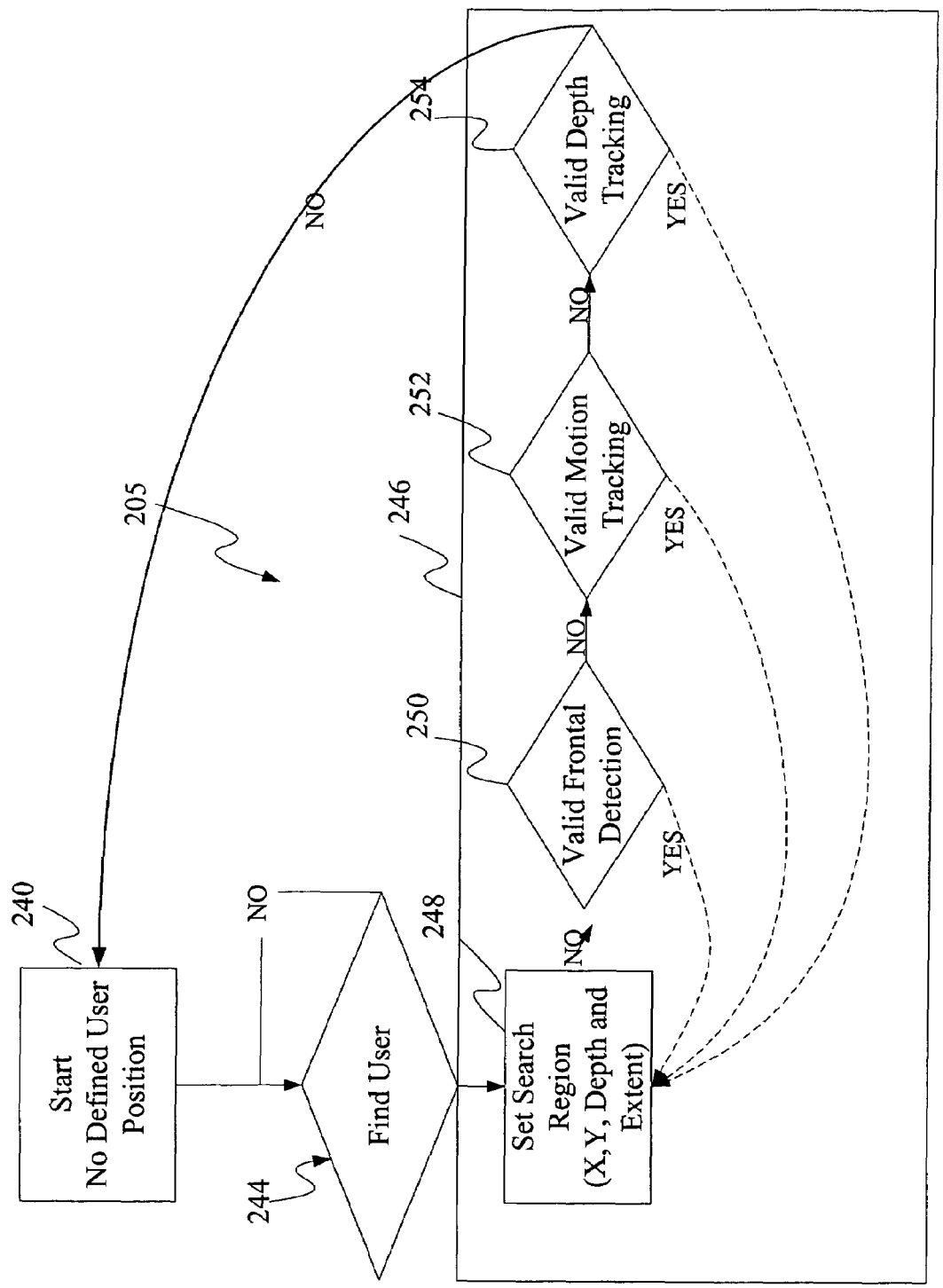
FIG. 4 is a block diagram of a visual processing component for locating a user based upon frontal detection, motion tracking and depth tracking.

FIG. 4 illustrates another embodiment of a visual processing implementation including not only face detection, but also motion and depth tracking to locate a user. Thus, in addition to a face detector, the visual processing component 205 in the illustrated embodiment includes motion and depth tracking to enhance control and detection. Logic or functionality of motion and depth tracking is disclosed in Yunqiang Chen and Yong Rui, "Real-time Speaker Tracking Using Particle Filter Sensor Fusion", Proceedings of the IEEE, vol. 92, no. 3, pp. 485-494, March 2004. In one embodiment, motion tracking relies on a head-and-shoulder silhouette of different or sequential images. Depth tracking relies on stereo images to provide a perspective or parallax of the user and others in the search region.

As shown in FIG. 4, the locator process begins with no defined user position as illustrated by block 240. The front face detector is used to search for, and identify the location of the nearest user as indicated at block 244. If a user is found, the system proceeds to a tracking loop 246. In the tracking loop 246, a local search region 248 is set using the previously found face area. For example, the face detector finds a nearest frontal face and determines the size of the face region and bases the local search region on the location and size of the face region. The visual perception device 204 is directionally positioned based on the local search region to provide an area for tracking. If depth tracking is used, a range of depth is included in the local search region.

In tracking loop 246, the visual image or input is scanned for frontal face detection as indicated by block 250. The frontal face detection is validated using the local search region. If the frontal face is detected, the user is tracked using motion tracking and depth tracking. If no frontal face is detected or found at block 250, motion tracking as shown in block 252 can be used to find the likely face areas which are validated using the local search region 248.

If no frontal face is still found, the local search region 248 can be tested for a depth profile or depth tracking as shown in block 254 consistent with the search region set at block 248. If nothing is found and the tracking period is within a suitable time period since the last detection, the system resets the local search region set at block 248 and continues tracking. If no face is detected and sufficient time has elapsed, the system invalidates the current search region and starts the search again at block 240.

In an illustrated embodiment, the system searches for the frontal face in ten (10) second intervals, although the application is not limited to a particular interval. Any other desired interval can be used as well. Further, although a particular search and tracking algorithm or methodology is described, the application is not limited to the particular steps or methodology described. Some of the steps could be eliminated, changed or combined, or completely different steps can be used.

In one embodiment, the visual perception device 204 includes a color camera or device to track color cues to locate the user. Different camera arrangements can be employed to provide different views or perspectives to track the user. Additionally, the visual image can be used in a recognition system to verify authenticity of the user, such as based on biometrics. In another embodiment, a mobile or adjustable camera device is used to increase or enhance the search region so that tracking is not lost when the user moves temporarily from the user interface 210. For example, the camera or device can include pan and/or zoom functions. In an illustrated embodiment, the pan, zoom or other camera adjustment is controlled by the motion tracking function or component.

Thus, in a speech recognition embodiment, the system detects and tracks the user using visual input 222 and pauses speech recognition whenever the user turns away from the visual perception device 204 or user interface 210, such as to face a visitor. In one embodiment, the visual perception device 204 includes multiple stereo cameras, although a single camera can be used. The user interface 210 can include a computer monitor or any other user interface device.

The audio device can be a microphone or microphone array. In one embodiment, a microphone array includes four microphones. In one illustrated orientation of these devices, the camera device and microphone array are both stacked on top of the computer monitor so that the relative orientation of the devices, relative to the user, is substantially the same. In this way, the orientation of the devices does not need to be calibrated to locate and detect a user. Of course, any stacking order can be used for the camera and microphone array, and any other orientation can be used as well.

It can thus be seen that the present system can be useful in many ways. For instance, if a user is working at a computer and a colleague comes to talk, some audio devices 202 focus on the loudest sound which could be the colleague's speech. Recognition of the colleague's speech may interfere with the user's application. In embodiments of the "look-to-talk" application, speech recognition is paused while the user is turned facing the colleague and does not resume until the system detects that the user is facing the computer or user interface again. For example, speech recognition is paused or disabled by turning off the audio device as illustrated by dotted line 212 in FIG. 2 or suppressing speech recognition. At the end of the interruption, when the user turns back to the user interface or computer, speech recognition continues.

In another embodiment, the "look-to-talk' control system is used to control other functions represented by block 208, such as a video teleconference function or component. The system detects a front face of the speaker or user prior to transmitting an utterance or speech. Thus, the audio signal of the speaker is transmitted to a remote participant while the user's front face is detected. When the speaker turns to have a private or "off-the-record" discussion with a local colleague, speech transmission is blocked or suppressed until the user's front face is detected again.

Figure 5:
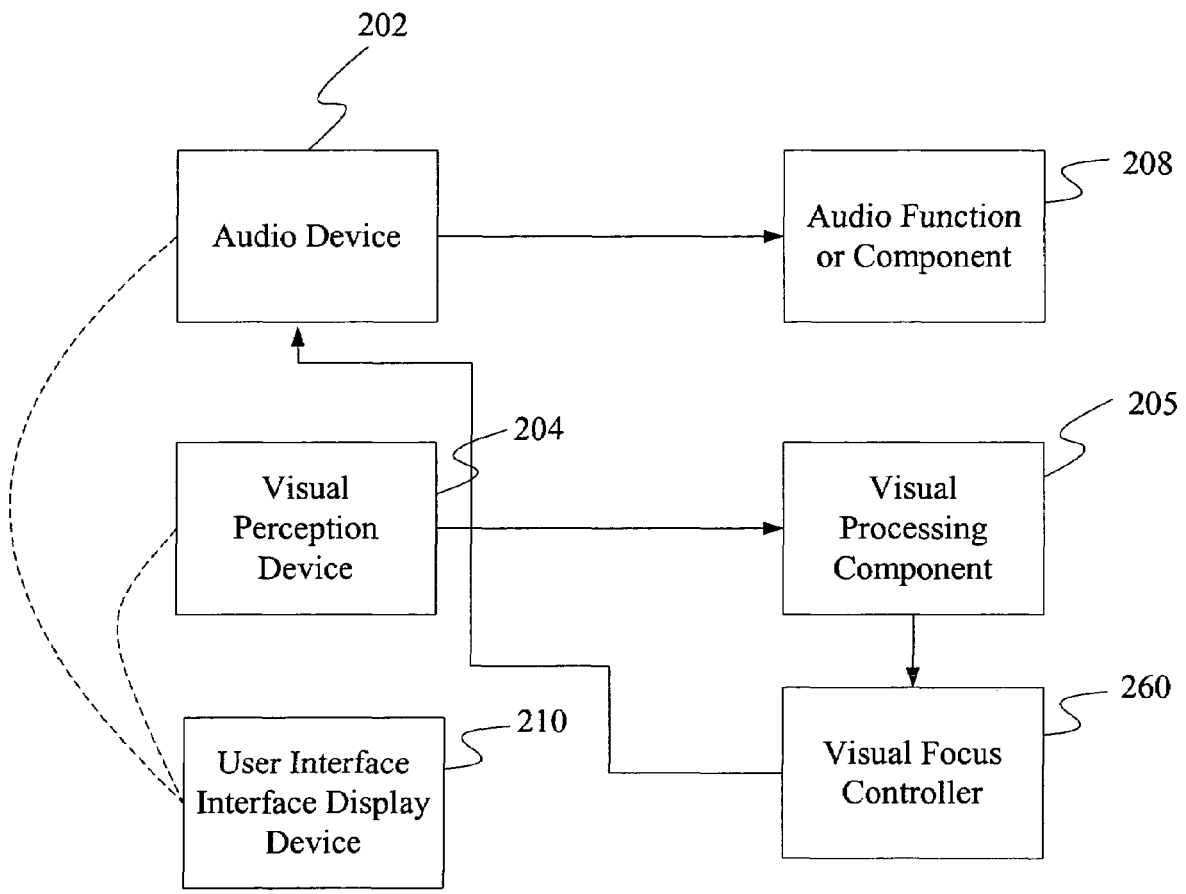
FIG. 5 is a block diagram of an embodiment of a visual control system including a visual focus interface to orient or focus an audio device based upon input from a visual perception device.

FIG. 5 illustrates another embodiment of a visual control system for controlling an audio function or functions, where like numbers are used to refer to like parts as in the previous FIGS. In the embodiment shown, the system includes a visual focus controller 260 to improve audio quality. The visual focus controller 260 is used to control the audio device 202 (such as a microphone array) to track the location of the user.

In one embodiment, the focus direction of a microphone array (or beam) is dynamically focused on the loudest sound in an area. However, this may be unreliable because of background noise or acoustic interference. The system illustrated in FIG. 5 uses visual input from the visual perception device 204 to visually focus the microphone array on the visual location of the user.

As shown in FIG. 5, visual processing component 205 processes input from the visual perception device 204 to detect and locate the user as described previously. In one embodiment, the processing component 205 uses face detection, motion tracking and depth tracking functions to locate the user as previously described. Output from the visual processing component 205 is provided to the visual focus controller 260 to focus or orient the audio device 202 relative to the location of the user based upon the visual input.

For example, when the user is working on his or her computer and someone comes to visit the user or someone is talking in a hallway nearby, the audio device 202 may tend to focus its detection on the loudest noise (e.g. on the colleague or hallway). However, in accordance with one embodiment, the visual focus controller 260 visually tracks the user to keep the microphone device focussed on the user. This improves signal-to-noise ratio for the user's speech. Audio from the focussed microphone device or array is processed and provided to an audio function or component 208 such as a speech recognition component, or video teleconferencing component.

In one embodiment, the user is tracked and other people or visitors are ignored unless they severely encroach on the user's space. For example, for video teleconferencing, the control system uses visual detection and tracking functions to focus or point the microphone device or array in the direction of the speaker instead of in the direction of the loudest noise which could be unrelated to the user and merely background noise.

Figure 6:
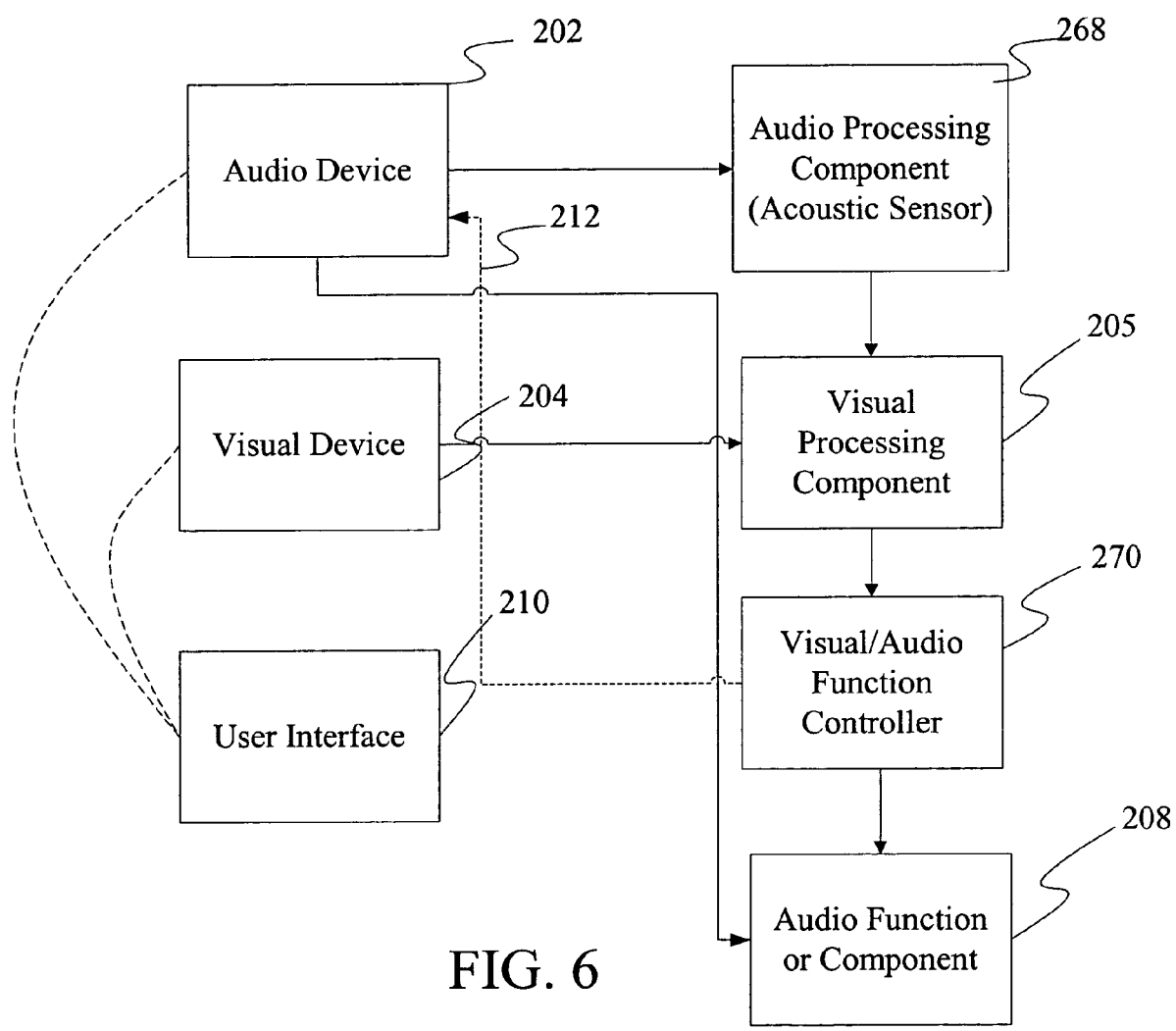
FIG. 6 is a block diagram of an embodiment of a visual control system including a controller which controls an audio function based upon input from a visual perception device and an audio device.

FIG. 6 illustrates an embodiment of a visual control system which uses visual input to reject sound which is not coming from the user's direction or location. In FIG. 6, like numbers are used to refer to like components in the previous FIGS. In the embodiment illustrated in FIG. 6, the control system includes an audio processing component or sensor 268 which is used to determine the direction or orientation of the sound detected by the audio device 202. Output from the audio processing component 268 is combined with the visual input in the visual processing component 205 to determine the direction of the sound relative to the visual location of the user. The function controller 270 uses the relative directions to control the audio function 208 (such as speech recognition) to interrupt, suppress or ignore input from the audio device 202 if it does not come from the user's location as determined visually.

The acoustic sensing function can be implemented with an acoustic beamforming algorithm or component. Logic and detail of an embodiment of an acoustic beamforming design is described in Ivan Tashev and Henrique S. Malvar, "A New Beamformer Design Algorithm for Microphone Arrays", In Proceedings of 2005 IEEE International Conference on Acoustics, Speech, and Signal Processing, Mar. 18-23, 2005, Philadelphia, Pa., USA although application is not limited to a particular embodiment.

Figure 7:
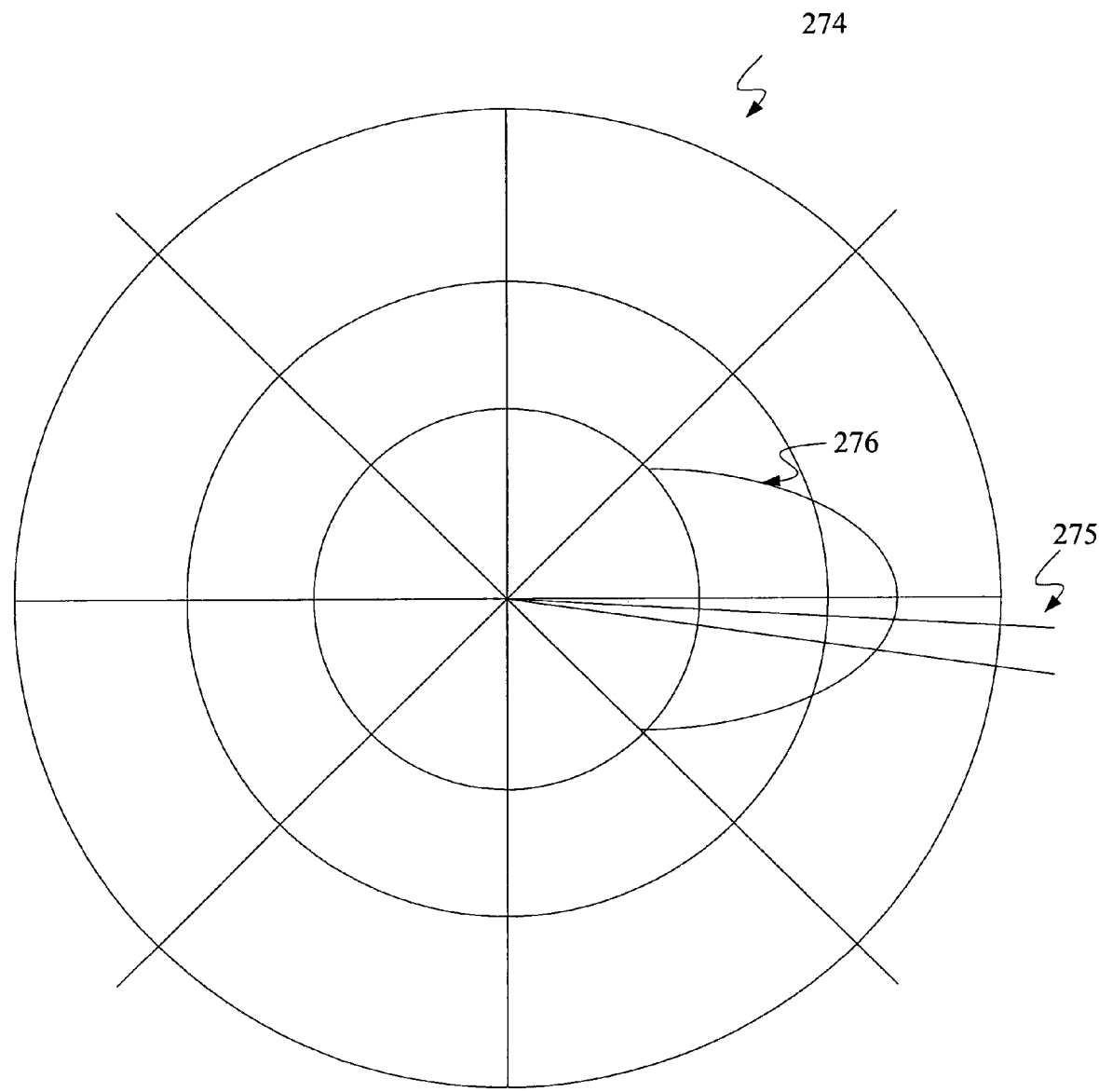
FIG. 7 is a polar plot illustrating direction of incoming sound to the audio device.

The acoustic beamforming component senses the direction of incoming sound in a 360 degree region as illustrated in the polar plot 274 of FIG. 7. Line 275 indicates the direction of the input sound and ellipse 276 represents the magnitude of the sound. Different weights are assigned to acoustic beams based upon the visual input. Input from the visual perception device 204 is used to eliminate or suppress input sound that does not come from the user's direction, as identified visually. For example, if the user is visually located in one region, sound from other regions is suppressed or is weighted less than the sound that comes from the user's location.

Figure 8:
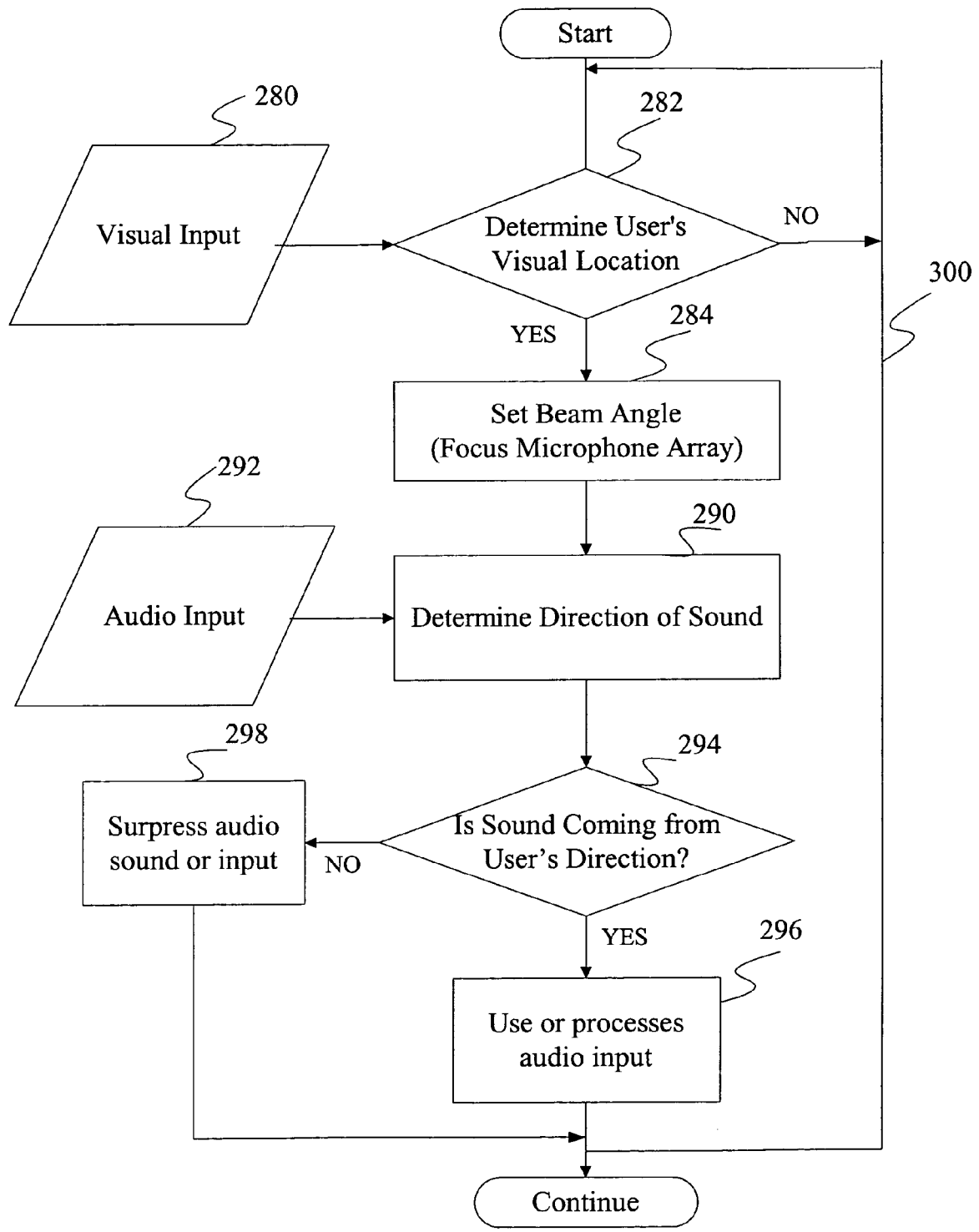
FIG. 8 is a flow chart illustrating steps for implementing function control based upon user location and sound direction.

FIG. 8 illustrates steps for implementing one embodiment which uses visual input to enhance speech recognition or other audio functions. As shown, the system receives visual input 280 from the visual perception device 204 (e.g., camera) to determine the user's location as illustrated by block 282. As previously discussed, motion, color and depth cues can be used to track the user. Thereafter, the beam angle for the microphone device (or array) is set, as illustrated by block 284 to focus the audio device or audio receiving device 202 on the user's visual location.

As shown in step 290, the system determines a direction of the audio input 292 from the audio device or microphone array 202. In step 294, the system determines whether the sound is coming from the user's direction (determined visually). If the sound is coming from the user's direction, then the controller function is enabled. For instance, audio signal 292 is processed by a speech recognition component for a speech recognition application as illustrated by block 296. Otherwise, the controlled function is disabled or otherwise modified. For instance, the audio input or signal can be suppressed or not recognized as illustrated by block 298. The process steps repeat to track the user and sound as illustrated by line 300 to provide continuous audio function control using visual input from a visual device 204.

Although the present invention has been described with reference to particular embodiments, workers skilled in the art will recognize that changes may be made in form and detail without departing from the spirit and scope of the invention. In particular, embodiments of the present invention have been described with respect. Application of the present invention is not limited to the specific embodiments or application to speech recognition.

What is claimed is:

1. A system for operating an audio component which uses or processes audio input from an audio receiving device, comprising:
    a visual processing component adapted to receive input from a visual perception device and to locate a user proximate to a display device based on the input to provide a visual control output; and
    a controller component configured to receive the visual control output from the visual processing component and disable the audio receiving device or the audio component to interrupt processing of the audio input by the audio component if the user is not facing in a direction of the display device.

2. The system of claim 1 wherein the controller component is configured to activate at least one processing function of the audio component when the user is facing the direction of the display device and the controller component is configured to disable the audio receiving device or the audio component when the user turns away from the direction facing the display device.

3. A system for operating a speech recognition component which uses or processes audio input from an audio receiving device comprising
    a visual processing component adapted to receive input from a visual perception device and to locate a user proximate to a user interface device;
    a controller component configured to receive a visual control output from the visual processing component and enable speech recognition if the user is facing in a direction of the user interface device and disable speech recognition when the user turns away from the direction facing the user interface device.

4. The system of claim 1 wherein the visual processing component is configured to perform motion tracking and depth tracking to track the location of the user proximate to the display device and the controller component is configured to detect when the direction of the user changes from facing the direction of the user display device to not facing the direction of the display device.

5. The system of claim 1 wherein the controller component is configured to adjust an orientation or alignment of the audio receiving device based upon the location of the user detected by the visual processing component and disable the audio input from the audio receiving device or processing of the audio input by the audio component if the user is facing away from the direction of the display device.

6. The system of claim 1 and comprising an audio direction sensor to sense an audio direction from which the audio receiving device is receiving the audio input and output from the audio direction sensor is combined with the visual control output to determine whether the audio direction corresponds to the location of the user proximate to the display device.

7. The system of claim 1 wherein the visual perception device and the audio receiving device are in a predetermined position relative to the display device.

8. The system of claim 1 wherein the visual perception device includes stereo cameras.

9. The system of claim 1 wherein the audio receiving device includes a microphone array.

10. The system of claim 1 wherein the audio component is a video telephone conference component and the controller component is configured to receive the visual control output from the visual processing component and disable a video telephone conference component process if the user is not facing in the direction of the display device.

11. A method for operating an audio component which uses or process audio input from an audio receiving device comprising:
    processing a visual input from a visual perception device to locate a user relative to a display and determine if the user is facing in a direction towards the display;
    enabling the audio receiving device or an audio component when the user is facing in the direction of the display; and disabling the audio receiving device or the audio component if the user is not facing in the direction of display to interrupt processing of audio input from the audio receiving device by the audio component if the user is not facing in the direction of the display.

12. The method of claim 11 wherein processing the visual input comprises:
    detecting a front face of the user; and
    enabling the audio component based upon detection of the front face of the user.

13. The method of claim 12 wherein the audio component is a speech recognition component and further comprising:
    tracking the location of the user via the visual input from the visual perception device; and
    interrupting speech recognition when the user turns away from the direction facing the user interface device.

14. The method of claim 11 and further comprising:
    tracking the location of the user; and
    adjusting an orientation of the audio receiving device based upon the location of the user.

15. The system of claim 1 and comprising a visual focus controller configured to receive the visual control output and adjust a position of the audio receiving device based upon the visual control output to follow the location of the user.

16. The system of claim 1 wherein the audio component comprises a speech recognition component and an audio visual processing component determines a direction of the audio input relative to a location of the user proximate to the display device to provide an output to suppress or interrupt speech recognition if the audio input is not coming from the user's location.

17. The method of claim 12 wherein the audio component includes a video telephone conference component and comprising:
   tracking the location of the user via the visual input from the visual perception device; and
   interrupting transmission of the audio input when the user turns away from the direction facing the display.

18. The method of claim 11 and comprising
   receiving output from an audio direction sensor;
   combining the audio direction sensor output and a visual control output to determine whether a direction of the audio output corresponds to the location of the user; and
   ignoring or suppressing the audio input from the audio receiving device if the direction of the audio input does not come from the location of the user.

19. The method of claim 13 and comprising:
   reenabling speech recognition when the user turns in the direction facing the display.

20. The system of claim 1 wherein the visual perception device uses biometrics to verify authenticity of the user.

* * * * *